(12) United States Patent
Ouchi

(10) Patent No.: US 7,062,116 B2
(45) Date of Patent: Jun. 13, 2006

(54) OPTICAL WIRING DEVICE

(75) Inventor: Toshihiko Ouchi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/958,370

(22) Filed: Oct. 6, 2004

(65) Prior Publication Data

US 2005/0058389 A1   Mar. 17, 2005

Related U.S. Application Data

(62) Division of application No. 09/627,448, filed on Jul. 27, 2000, now Pat. No. 6,854,901.

(30) Foreign Application Priority Data

Jul. 28, 1999   (JP)   ............................ 11-213005

(51) Int. Cl.
*G02B 6/12*   (2006.01)
(52) U.S. Cl. ............... 385/14; 385/88; 385/89
(58) Field of Classification Search ............ 385/88–92, 385/14
See application file for complete search history.

(56) References Cited

U.S. PATENT DOCUMENTS

| | | | | |
|---|---|---|---|---|
| 4,595,839 A | 6/1986 | Braun et al. | ................. | 250/551 |
| 4,767,168 A | 8/1988 | Grandy | ....................... | 350/96.2 |
| 5,005,939 A | 4/1991 | Arvanitakis et al. | ........... | 385/53 |
| 5,586,131 A | 12/1996 | Ono et al. | ..................... | 372/19 |
| 5,590,232 A | 12/1996 | Wentworth et al. | ........... | 385/92 |
| 5,631,988 A | 5/1997 | Swirhun et al. | .............. | 385/89 |
| 5,659,560 A | 8/1997 | Ouchi et al. | ................... | 372/27 |
| 5,663,526 A | 9/1997 | Card et al. | ................. | 174/52.1 |
| 5,699,373 A | 12/1997 | Uchida et al. | ................. | 372/27 |
| 5,764,670 A | 6/1998 | Ouchi | .......................... | 372/45 |
| 5,774,614 A | 6/1998 | Gilliland et al. | .............. | 385/88 |
| 5,835,646 A | 11/1998 | Yoshimura et al. | ........... | 385/14 |
| 5,959,315 A | 9/1999 | Lebby et al. | .................. | 257/98 |
| 6,238,100 B1 | 5/2001 | Sasaki et al. | ................. | 385/59 |
| 6,334,012 B1 | 12/2001 | Yoon et al. | ................... | 385/24 |
| 6,386,768 B1 | 5/2002 | Yoon et al. | ................... | 385/88 |
| 6,477,286 B1 | 11/2002 | Ouchi | .......................... | 385/14 |

FOREIGN PATENT DOCUMENTS

| | | |
|---|---|---|
| JP | 06-174981 | 6/1994 |
| JP | 07/30209 | 1/1995 |
| JP | 08/78783 | 3/1996 |
| JP | 09/80360 | 3/1997 |

OTHER PUBLICATIONS

"Development of the Active Connector", Ryoji Kaku, et al., Technical Report of I.E.I.C.E., EMD96-12, pp. 5-10 (Jun. 1996).

"Development of the Active Connector" The Institute of Electronics, Kaku, et al., Technical Reporting Office, Information and Communication Engineers, Shingakugihou EMD 96-12 (1996-OG).

*Primary Examiner*—Ellen E. Kim
(74) *Attorney, Agent, or Firm*—Fitzpatrick, Cella, Harper & Scinto.

(57) ABSTRACT

An optical wiring device includes an electric connecting portion, an optical transmission unit for transmitting an optical signal, and an optical device for conducting an optoelectric conversion. The optical device is provided between the electric connecting portion and the optical transmission unit. The optical device includes at least one of a surface light emitting device, which is modulated by an electric signal supplied through the electric connecting portion, and a surface light receiving device, which converts an optical signal transmitted through the optical transmission unit to an electric signal.

2 Claims, 15 Drawing Sheets

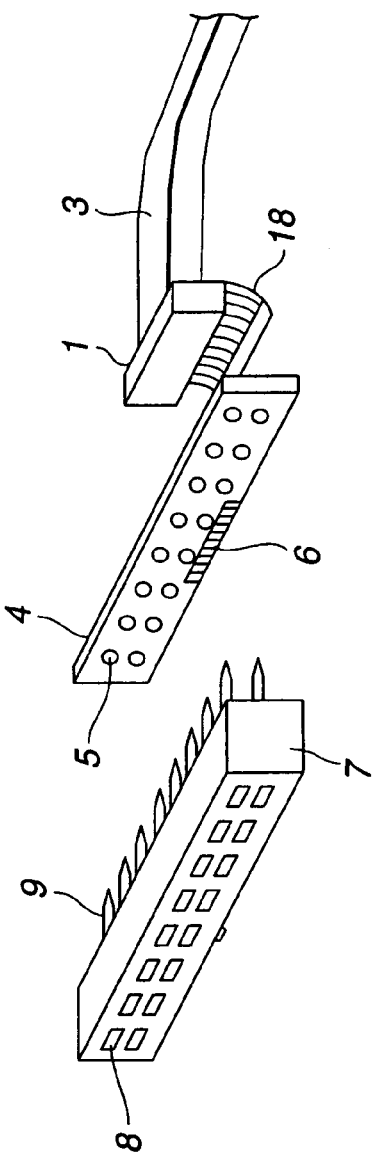
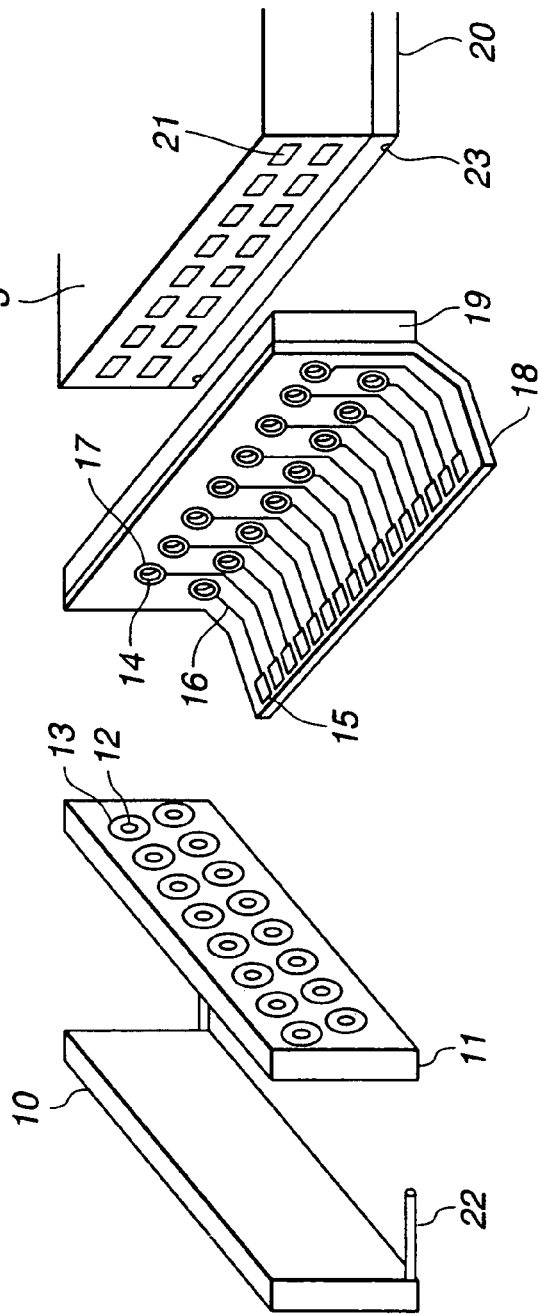

FIG.11A
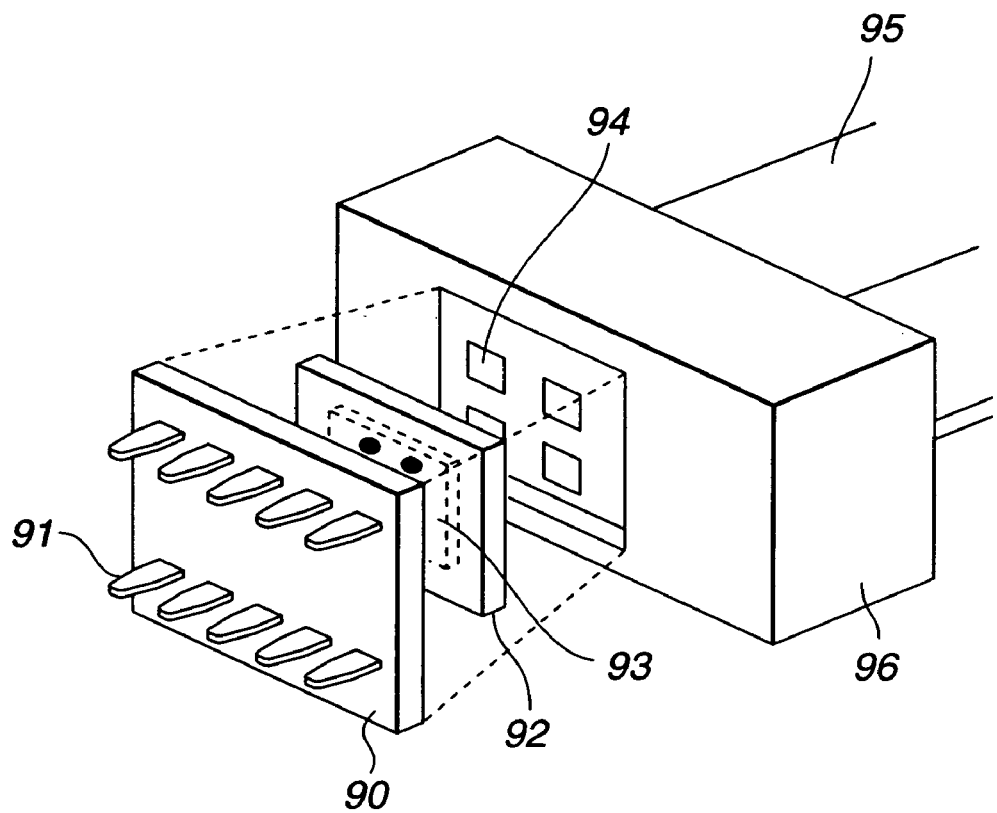
FIG.11B
FIG.11C
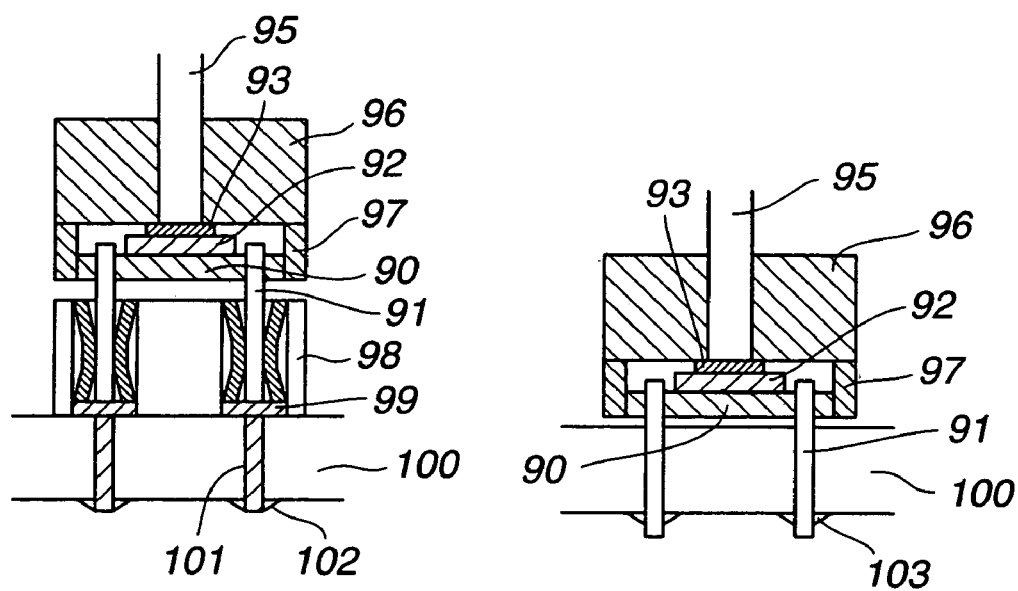

OPTICAL WIRING DEVICE

This application is a divisional of application Ser. No. 09/627,448, filed Jul. 27, 2002 now U.S. Pat. No. 6,854,901, now allowed, the contents of which are incorporated by reference herein.

BACKGROUND OF THE INVENTION

1. Field of the Invention

This invention relates to an optical wiring device, such as an optical connector and a waveguide cable, for optically connecting electronic equipment, boards in electronic equipment, or apparatuses to each other, its driving method, and so forth.

2. Related Background Art

In recent years, the speed of computers, information processing, and computer environment, including displays and printers, has been increasing. At the same time, problems of signal delay, heat generation and electromagnetic radiation emission noise (EMI) due to the electric wiring occur in connections between boards, in electronic equipment, between a board and a built-in device, and between electronic equipment. Solutions of those problems are, however, difficult. It is hence apparent that limitations in the electric wiring will be a serious problem in the near future.

Between apparatuses, a system has been developed in which fast transmission by giga-bit Ethernet and IEEE1394 is established by using twisted pair cables or the like. As a transmission system for achieving fast transmission, a method of using a low voltage differential signal with a small amplitude (low voltage differential signalling (LVDS)) is generally used. The range of its use is, however, restricted since costs of its interface IC and cable, such as a twinax cable, are high. Further, in its high-speed transmission at about 1 Gbps, impedance matching is required, and its transmission distance is limited to about 10 m.

Parallel connection, which requires no dedicated integrated circuit (IC), is also frequently employed between boards in an apparatus. However, when its total rate exceeds 1 Gbps, problems occur due to the number of pins, connector reliability, space, skew (delay between channels), and the cost and weight of cables.

Furthermore, in either case, the problem of EMI is serious in the electric wiring, and its seriousness increases as the transmission speed becomes faster.

As a method for solving the problems of limitations in the electric wiring, techniques of optical connection are under course of development. In the optical connection, O (optical)/E (electric) and E (electric)/O (optical) converting portions are ordinarily provided in an apparatus, and the optical coupling is conducted by connecting an optical fiber or the like using an optical connector.

FIG. 1 illustrates an example as disclosed in Japanese Patent Application Laid-Open No. 6(1994)-174981. In FIG. 1, an optical active receptacle 1001 with two-dimensionally arrayed E/O and O/E converting portions is fixed to a wiring board 1050, and an optical connector 1060 is inserted into the receptacle 1001 such that an optical fiber 1061 is optically coupled to the converting portions. It is thereby possible to achieve a large-capacity optical interconnection by using a bundle fiber 1063. In the structure of FIG. 1, there are further provided a driving electronic circuit 1020, an optical connecting portion 1040, an optical coupling portion 1066, and a guide pin 1067.

Such a system eliminates the signal delay due to parasitic capacitance as appears in the electric wiring, signal degradation resulting from an unstable ground, and EMI emitted from the wiring. The system is therefore expected to be the next-generation in wiring techniques. There is, however, the problem that precise implementation of optical connector and optical device is required to reduce optical losses, and hence, its cost increases and the system is difficult to put into practice. Further, when a large number of channels and optical connecting portions are needed to achieve a large-capacity transmission, problems of yield and space occur, and hence, its use in place of the electric wiring is limited. Furthermore, the system is not reliable for frequent loading and unloading, and ordinary handling is not easy. Therefore, the system is not suitable for use in electronic equipment intended for general consumers.

In the above situation, the following method has been proposed by Japanese Patent Application Laid-Open No. 9(1997)-80360. In this method, an optical coupling portion is built in and fixed to a connector, and a wiring board and an optical wiring cable are connected by the electric wiring. As illustrated in FIG. 2, an optical multi-chip-module (MCM) 1101 with integrated organic waveguide and optical modulator 1107 is fixedly coupled to an optical fiber 1100, and a modulating signal for the optical modulator 1107 is input therein through a pin 1102 for electric connection. Accordingly, when the connector with integrated pin 1102, optical MCM 1101 and optical fiber 1100 is inserted into a conventional socket 1103, the optical connection is accomplished. In the system, the connecting portion need not be precisely fabricated due to its fixed-type optical connection. Thus, cost can be reduced, loading and unloading are easy, reliability is high, and general consumers can handle the optical connector, and hence, a general-purpose connector can be achieved. In the system of FIG. 2, there are further provided an optical coupler 1105, a laser diode 1106 (continuous wave (CW) oscillation), a photodiode 1108, an amplifier 1109, and a Si substrate 1110.

In the system of FIG. 2, however, yield is likely to decrease and there is a limitation to a compact size, because a plurality of high-performance devices (i.e., optical modulators 1107) are arranged on the optical MCM 1101. Further, output light from the laser diode 1106 is branched, so the light intensity is considerably decreased in the case of multi-channel. Furthermore, the module 1101 is constructed by using a plane waveguide. Accordingly, arraying is basically one-dimensional, and hence, the optical cable is likely to be widened when the optical connection is conducted by using a bundle optical fiber or sheet-shaped multi-core waveguide. Thus, the size of the structure increases, and bending handling is restricted.

SUMMARY OF THE INVENTION

It is an object of the present invention to provide an optical wiring device which includes a built-in E/O and/or O/E converting portion, an electric connecting portion and an optical transmitting waveguide, which is readily adaptable to optical interconnection, and whose cost can be reduced, and so forth.

The present invention is generally directed to an optical wiring device which includes an electric connecting portion, a optical transmission unit for transmitting an optical signal, and an optical device for conducting an optoelectric conversion. The optical device is provided between the electric connecting portion and the optical transmission unit, and the optical device includes at least one of a surface light emitting device, which is modulated by an electric signal supplied through the electric connecting portion, and a surface light receiving device, which converts an optical signal transmitted through the optical transmission means to an electric signal. In this structure, alignment and fixing between the optical device and the optical transmitting unit can be readily and precisely achieved by using surface implementation, and hence, reduction of cost, enhancement of reliability and easy handling of the device can be envisaged.

The following more specific structures are possible in the above structure.

A plurality of the optical devices, such as one-dimensionally or two-dimensionally arrayed surface optical devices, may be arranged and integrated. The optical device may be aligned with, optically coupled to and fixed to the optical transmission unit. The electric connecting portion may be a connector which can be removably connected to an external electric element.

The optical transmission unit may include a light input/output end surface, and the optical device can be surface-implemented on the light input/output end surface with the surface light emitting or receiving device abutting the light input/output end surface.

The surface light emitting device is typically a surface emitting laser. The surface light receiving device is typically a p-i-n photodiode, or a metal-semiconductor-metal (MSM) photodiode.

The optical wiring device may further include a wiring substrate, a plurality of the optical devices with respective independent electrodes can be arranged in an array, the respective independent electrodes can be bonded to the wiring substrate in a flip-chip manner, and the electric connecting portion can include a plurality of conductors to which the independent electrodes are electrically connected through the wiring substrate, respectively. In this case, the wiring substrate may include a window for passing light from or to the optical device, and the optical device can be optically coupled and bonded to the optical transmission unit in a surface-implementation manner, with the wiring substrate interposed between the optical device and the optical transmission unit. Alternatively, the optical wiring device may further include a plate with a window for passing light from or to the optical device, and the optical device can be optically coupled and bonded to the optical transmission unit in a surface-implementation manner with the plate interposed between the optical device and the optical transmission unit.

The wiring substrate is typically a flexible wiring substrate which is freely flexible. Thereby, electric implementation of the optical device can be readily achieved in the optical wiring device. Where a flexible substrate, such as a tape automated bonding (TAB) tape, is used, even a three-dimensional electric wiring is possible and the degree of the electric implementation can be enlarged.

The optical wiring device may further include an electronic circuit device for driving the optical device, which is integrated on the electric connecting portion. The electronic circuit device may have a parallel-to-serial converting function. When such an IC for driving the optical device or performing the parallel-to-serial conversion of a signal is thus integrated, the space required for a printed circuit board in external electronic equipment can be reduced.

The optical wiring device may further include an electronic circuit device in which an integrated circuit (IC) and the optical device electrically connected to the IC are integrated on a common Si substrate in a hybrid manner and a bare chip of the optical device is implemented on the common Si substrate in a flip-chip manner. Thereby, the optical wiring device can be made compact.

The optical device may be a surface emitting laser sandwiched between the optical transmission unit and the wiring substrate, and the surface emitting laser may be comprised of a cavity with an active layer sandwiched between multi-layer reflective mirrors with its growth semiconductor substrate removed. Alternatively, the optical device may be a surface emitting laser sandwiched between the optical transmission means and a plate, and the surface emitting laser may be comprised of a cavity with an active layer sandwiched between multi-layer reflective mirrors with its growth semiconductor substrate removed. In this structure, since the growth substrate for forming the optical device thereon, such as a GaAs or InP compound semiconductor substrate, is removed, a very compact construction capable of high-speed driving can be obtained with a high degree of environmental safety.

The optical transmission unit may be a waveguide sheet in which waveguide cores are arranged in an array and which can be fabricated by photolithography and etching. Arrayed optical devices can be readily abutted the waveguide cores, respectively, and a transmission capacity can be increased by using a spatial multiplexing optical transmission.

The optical transmission unit may also be an array of optical fibers, to whose end surfaces the arrayed optical devices can be optically coupled in a perpendicular light input/output manner and fixed.

The optical transmission unit may include a metal thin film for conducting an electric connection. The optical transmission unit can perform the electric connection as well as the optical transmission. When an electric wiring pattern of the metal thin film is bonded to the optical transmission unit, the electric connection for a low-frequency signal, an electric power source, or a ground can be carried out as well.

The electric connecting portion may be constructed such that the electric connecting portion is removably connected to an external receptacle formed in an electronic apparatus. Thereby, optical interconnection can be achieved from a wiring board in the electronic apparatus through the optical wiring device of the present invention.

The electric connecting portion may also be constructed such that the electric connecting portion is electrically connected with a solder to a printed board provided in an electronic apparatus. Thereby, a space on the printed board can be reduced.

The optical device may be a surface emitting laser, which is driven directly by the on-and-off of a complementary metal-oxide semiconductor (CMOS) buffer at an output stage of an external apparatus that is connected to the electric connecting portion, and a driving current of the surface emitting laser may be controlled by a resistor inserted serially with the surface emitting laser.

The optical device may also be a surface emitting laser, which is driven directly by the on-and-off of a CMOS buffer at an output stage of an electronic circuit which is provided between the surface emitting laser and the electric connecting portion and electrically connected to the electric connecting portion, and a driving current of the surface emitting laser may be controlled by a resistor inserted serially with the surface emitting laser. Here, the on-off driving of the surface emitting laser is performed by switching the laser by a transistor at the output stage of a large scale integrated circuit (LSI) or the like, the resistor and the laser are serially connected to a voltage source, and an amount of current injected into the laser is determined by its resistance value.

Further, the present invention is directed to an electronic apparatus, in which a printed circuit board with an electronic integrated device, such as a large scale central arithmetic processing unit (a microprocessor unit (MPU)) and a random access memory (RAM), mounted thereon and an apparatus, such as an MCM and a memory, are connected to each other by the above optical wiring device. In this structure, high-speed signal processing is possible, space for the cable can be reduced, the problem of EMI can be moderated, and no design for high-frequency matching is required.

Furthermore, the present invention is directed to an electronic apparatus, wherein a computer body with a device, such as a central processing unit (CPU), mounted therein and a display with an input/output (I/O) port are connected to each other by the above optical wiring device, and/or wherein the computer body and a network, such as a local area network (LAN), are connected to each other by the above optical wiring device. Also in this structure, the same technical advantages as above can be obtained.

These advantages and others will be more readily understood in connection with the following detailed description of the more preferred embodiments in conjunction with the drawings.

BRIEF DESCRIPTION OF THE DRAWINGS

FIG. 3A is a perspective view illustrating a disassembled structure of an optical wiring connector.

FIG. 3B is a perspective view illustrating a disassembled structure of an E/O converting portion in a first embodiment according to the present invention.

FIG. 11A is a perspective view illustrating the disassembled structure of an optical wiring connector of a second embodiment according to the present invention.

FIG. 11B is a cross-sectional view illustrating a method of connecting the second embodiment to a board.

FIG. 11C is a cross-sectional view illustrating another method of connecting the second embodiment to a board.

DESCRIPTION OF THE PREFERRED EMBODIMENTS

First Embodiment

Figure 1:
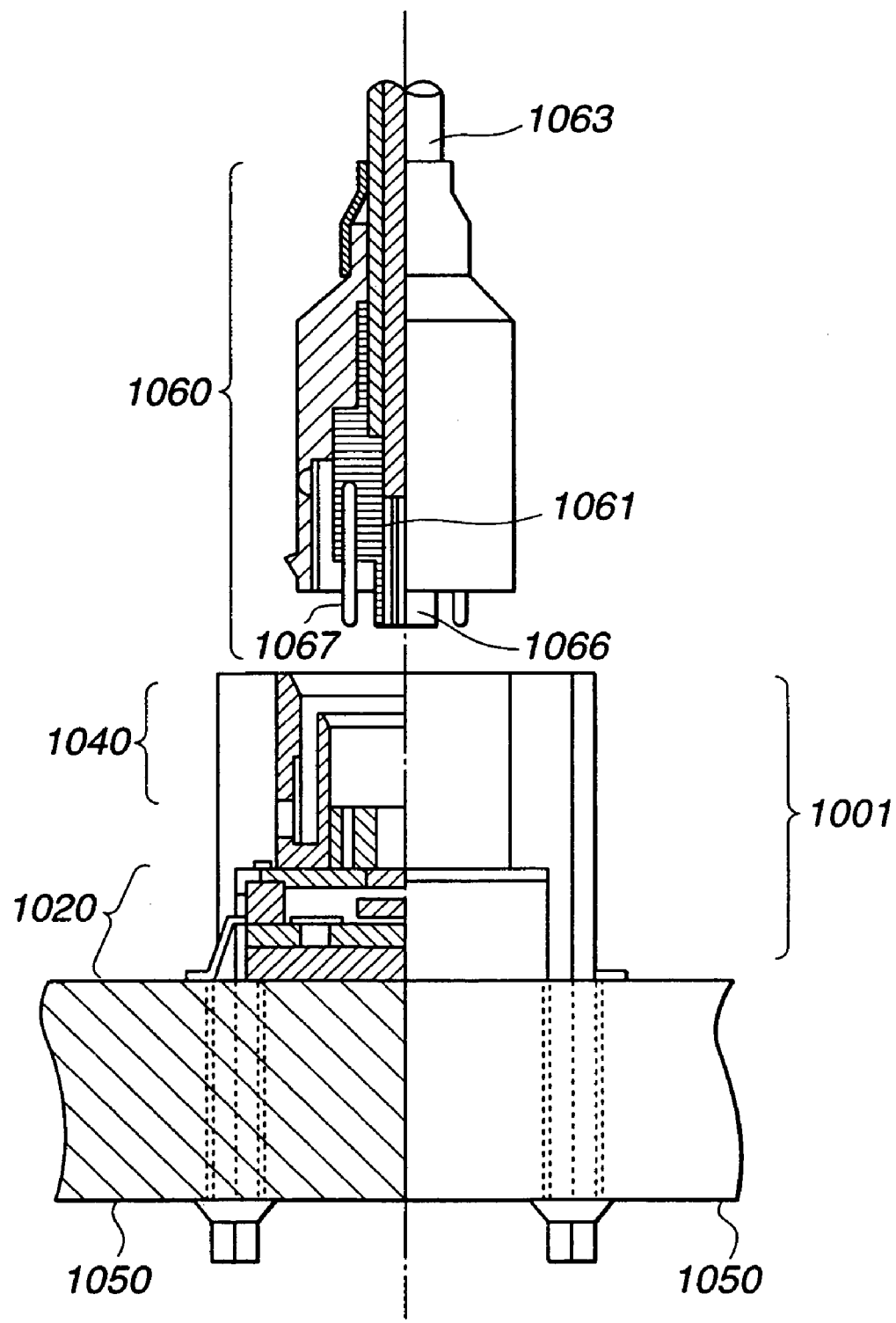
FIG. 1 is a view illustrating a prior art optical connector with its half cross-sectional.
Figure 2:
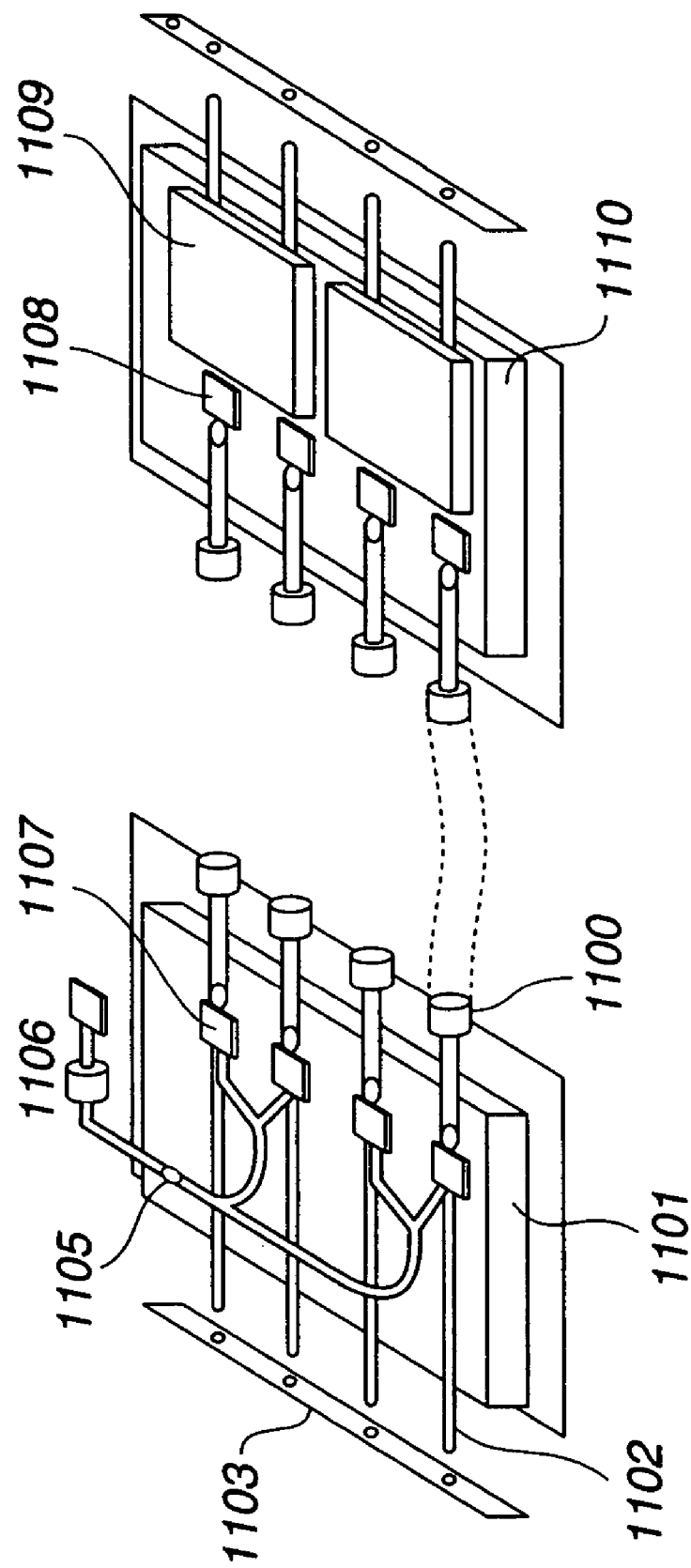
FIG. 2 is a perspective view illustrating a prior art optical wiring connector with its part cut-away.

FIG. 3A illustrates structures of electric and optical connecting portions of a first embodiment of the present invention directed to an optical wiring device. In the optical wiring device of FIG. 3A, a connecting portion 7 for electric connection is provided, and the electric connecting portion 7 includes a recessed electric coupler of two-dimensionally arranged recesses 8 and two-dimensionally arranged pins 9 for electrically connecting the corresponding recesses 8 to rear-stage electric wires. The connecting portion 7 is composed of a conventional resin, for example. There are sixteen (16=2×8) pins 9 in the structure of FIG. 3A, but the number thereof is not limited to this configuration. The recesses 8 may be replaced by protruding pins.

At the rear of the connecting portion 7, there is provided a plate 4 including two-dimensionally arranged holes 5, serially arranged electrode pads 6, and a wiring pattern (not shown) for electrically connecting each hole 5 to each pad 6. The pins 9 of the connecting portion 7 are inserted into and soldered to the holes 5 of the plate 4, respectively, and the plate 4 is thus fixed to the connecting portion 7. The plate 4 may also be formed of a conventional resin that is usually used to form an electric printed board. When necessary, an electronic circuit for driving an optical device (later described in detail) may be formed on the plate 4.

Further, at the rear of the plate 4, there is provided an E/O and/or O/E converting portion 1 bonded to the plate 4. Surface optical devices of the converting portion 1 are integrated with a multi-core waveguide 3. Each optical device is electrically connected to each electrode pad 6 by a flexible substrate 18, such as a TAB tape, which includes an electric wiring pattern formed thereon. After all the components are assembled, the entire structure is covered with a protector, or molded with resin for easy handling.

FIG. 3B also illustrates a detailed structure of the converting portion 1. In the case of the E/O converting portion, a laser array 11 of two-dimensionally arranged surface emitting lasers is so implemented as to be sandwiched between two plates 10 and 19. An independent wiring 16 to each optical device is formed on the TAB tape 18. More specifically, each ring electrode 13 formed around a light radiating portion 12 of each laser is aligned with each ring electrode 17 on the TAB tape 18, and these ring electrodes 13 and 17 are connected in a flip-chip manner. In the flexible substrate 18, a window 14 for passing light therethrough is formed in the ring electrode 17 corresponding to each light radiating portion 12. A common electrode of the surface emitting lasers may be provided on the side of the plate 10, or the TAB tape 18. Each electrode 17 is connected to each electrode pad 15 through the wiring 16. The electrode pad 15 is connected to the electrode pad 6 formed on the plate 4.

The plate 19 is fixed to the multi-core waveguide 3 by an adhesive agent such that each surface emitting laser is aligned with each core 21 of the waveguide 3. The light radiation angle of the surface emitting laser is small, say less than 10°. Therefore, when the size of the core 21 is about a square of 100 μm×100 μm, optical loss is small even if the thickness of the plate 19 is about 100 μm. Further, tolerance of optical implementation is about 20 to 30 μm, so such a passive alignment, in which a guide pin 22 formed on the plate 10 is inserted into a hole 23 formed in a supporting plate 20 of the multi-core waveguide 3, will suffice. Where a bundle of optical fibers with a core diameter of 50 μm is used as the waveguide, it is preferable to fit a lens into the window 14 for the purposes of increasing a coupling efficiency.

It is preferable to form the plates 10 and 19 and the TAB tape 18 of material with a good thermal conductivity for effective heat radiation of the laser array 11. The plates 10 and 19 are formed of metal, or a ceramic thin film of $Al_2O_3$ or AlN, and the TAB tape 18 is formed of a polyimide film containing $Al_2O_3$ powders. Further, a metal film and a heat-radiating means, such as a fin (not shown), can be bonded to a surface of the plate 10, on which the plate 4 is bonded, to increase the heat radiation efficiency from the laser array 11.

The description has been made to the E/O converting device in the foregoing. Instead, in the case of the O/E converting device, a p-i-n photodiode (PD), a metal-semiconductor-metal (MSM) device or the like is employed as a surface light receiving device, and this device is implemented in the same manner as that of the surface emitting laser. Electrodes of the p-i-n photodiode are formed in approximately the same manner as that of the above electrodes of the surface emitting laser, and electrodes of the MSM device are formed as comb-shaped electrodes on a common surface.

Figure 4:
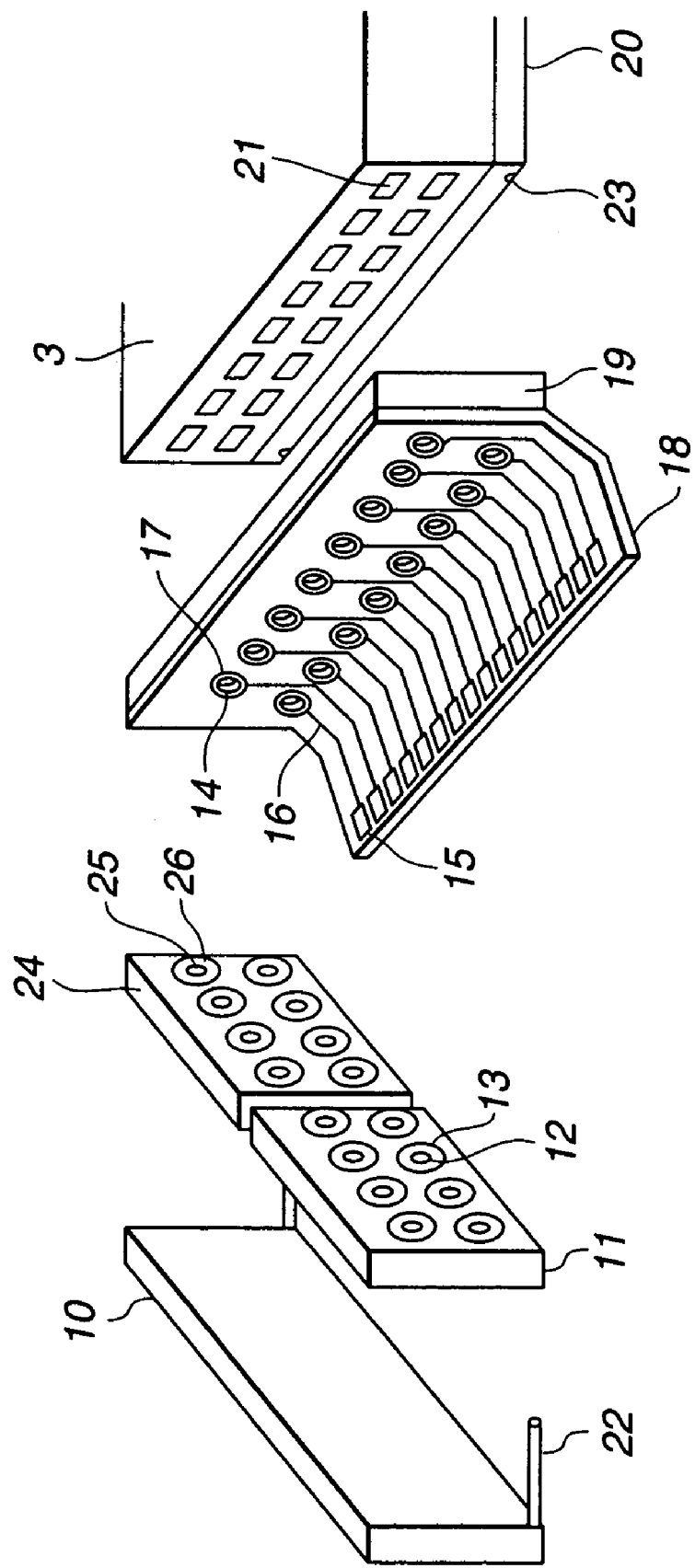
FIG. 4 is a perspective view illustrating the disassembled structure of integrated O/E and E/O converting portions in an optical wiring connector according to the present invention.

In the above-discussed optical wiring connector, one-way connection is assumed, in which one end of the waveguide (optical cable) 3 is coupled to the E/O converting portion and the other end thereof to the O/E converting portion. It is naturally possible to achieve a bi-directional connection in which each end includes both the E/O and O/E converting portions. In this case, there are provided both a laser array 11 of the surface emitting lasers and an array 24 of surface light receiving devices with a light receiving portion 25 and an electrode 26 implemented in a flip-chip manner on a common plate 19, as illustrated in FIG. 4. The remaining structure of FIG. 4 is the same as that of the above-discussed structure. It is naturally possible to fabricate the surface emitting lasers and surface light receiving devices on the same substrate as illustrated in FIG. 3B.

Figure 5:
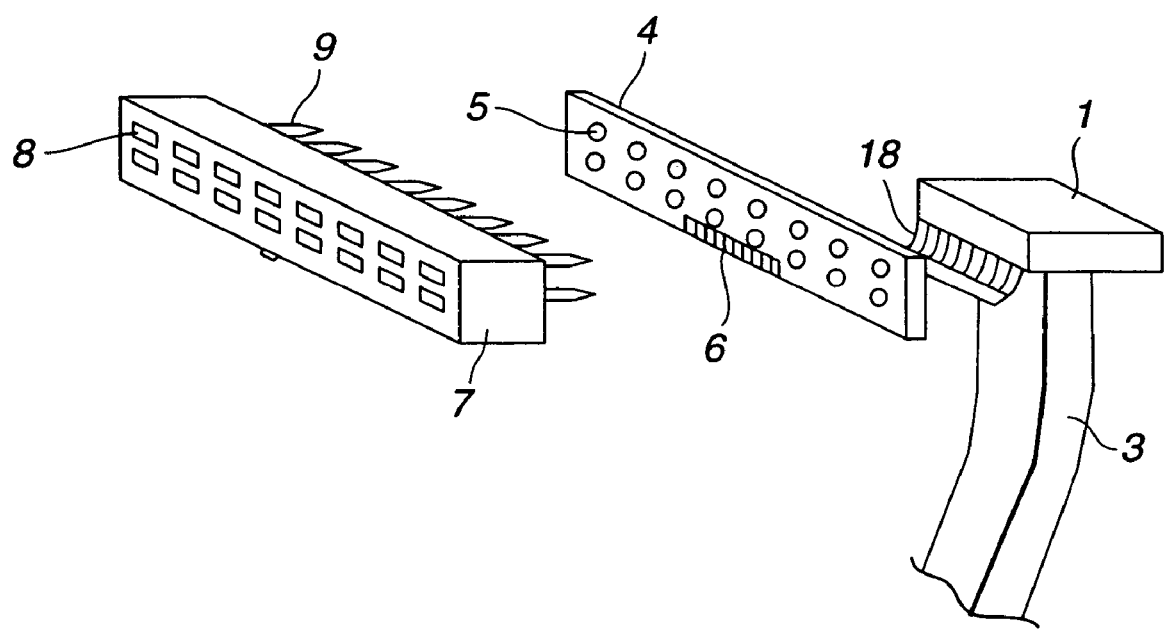
FIG. 5 is a perspective view illustrating the disassembled structure of an L-shaped optical wiring connector according to the present invention.

Further, while the insertion direction of the connecting portion is the same as the extension direction of the optical cable 3 in the above structure, these directions may differ from each other as illustrated in FIG. 5. In FIG. 5, the insertion direction of the converting portion forms right angles relative to the extension direction of the optical cable 3 to construct an L-shaped connector.

The multi-core waveguide 3 for optical wiring will be described. The waveguide 3 can be preferably and conveniently formed of fluorine-contained PMMA, epoxy resin, polyimide, or the like. A fabrication method of the waveguide 3 will be described by reference to FIGS. 6A to 6F.

Figure 6A:
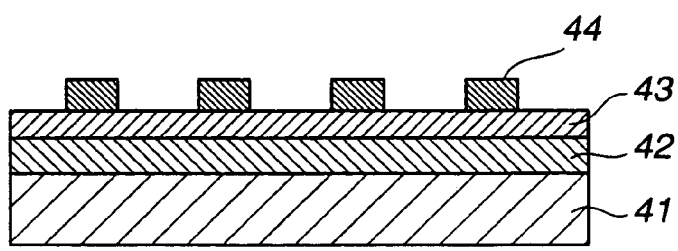
FIGS. 6A to 6F are cross-sectional views illustrating a method of fabricating a waveguide sheet with arrayed waveguides in the first embodiment.
Figure 6B:
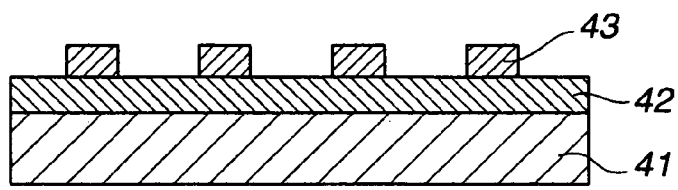
Figure 6C:
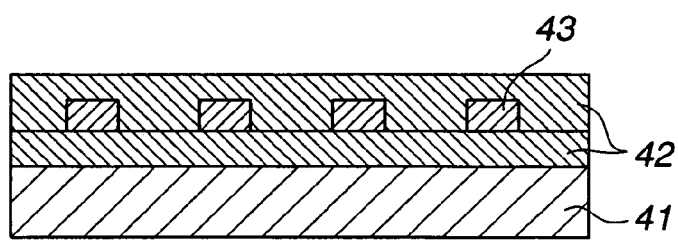

As illustrated in FIG. 6A, an optical resin 42 for forming a clad is initially coated on a Si-substrate 41 using a spinner or the like, and then hardened. Thereafter, a layer 43 with a slightly-high refractive index for forming a core is coated in the same manner, and a photoresist 44 is then deposited and shaped into a core pattern by photolithography and etching. As illustrated in FIG. 6B, after a core pattern is formed by a reactive ion etching (RIE) using oxygen plasma, the photoresist 44 is removed. This core pattern is then buried with a cladding resin 42, and its surface is flattened by an etch-back process, as illustrated in FIG. 6C.

Figure 6D:
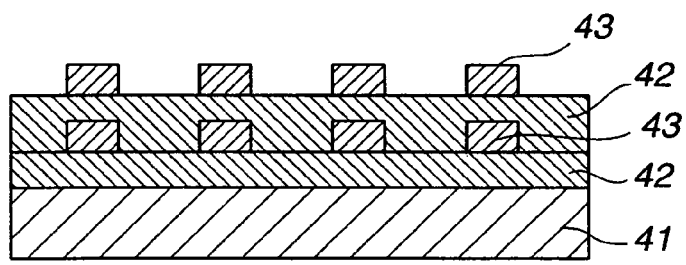
Figure 6E:
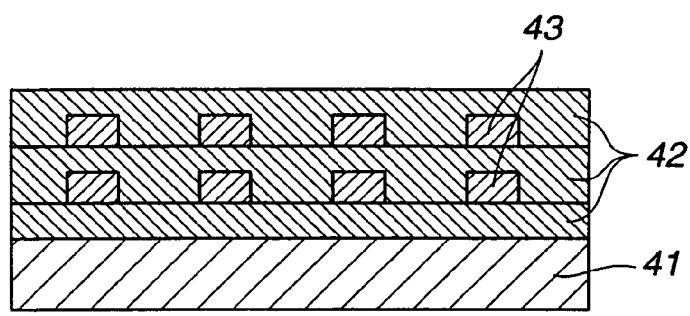

As illustrated in FIG. 6D, another array of cores 43 are then similarly formed. Here, positions of the lower and upper cores 43 can be precisely aligned with each other by using alignment marks of a mask. Further, as illustrated FIG. 6E, a cladding layer of resin 42 is coated on the upper cores 43, and flattened similarly.

Figure 6F:
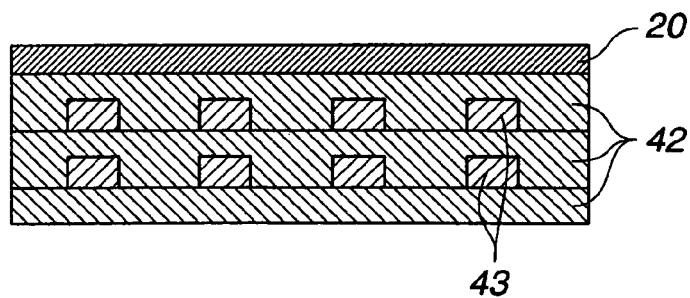

Finally, as illustrated in FIG. 6F, a metal thick layer 20 is formed on the uppermost cladding layer 42, and the Si-substrate 41 is removed by mechanical polishing and wet etching using KOH. Thus, the flexible multi-core waveguide or cable 3, as illustrated in FIGS. 3A and 3B, is obtained.

Figure 7:
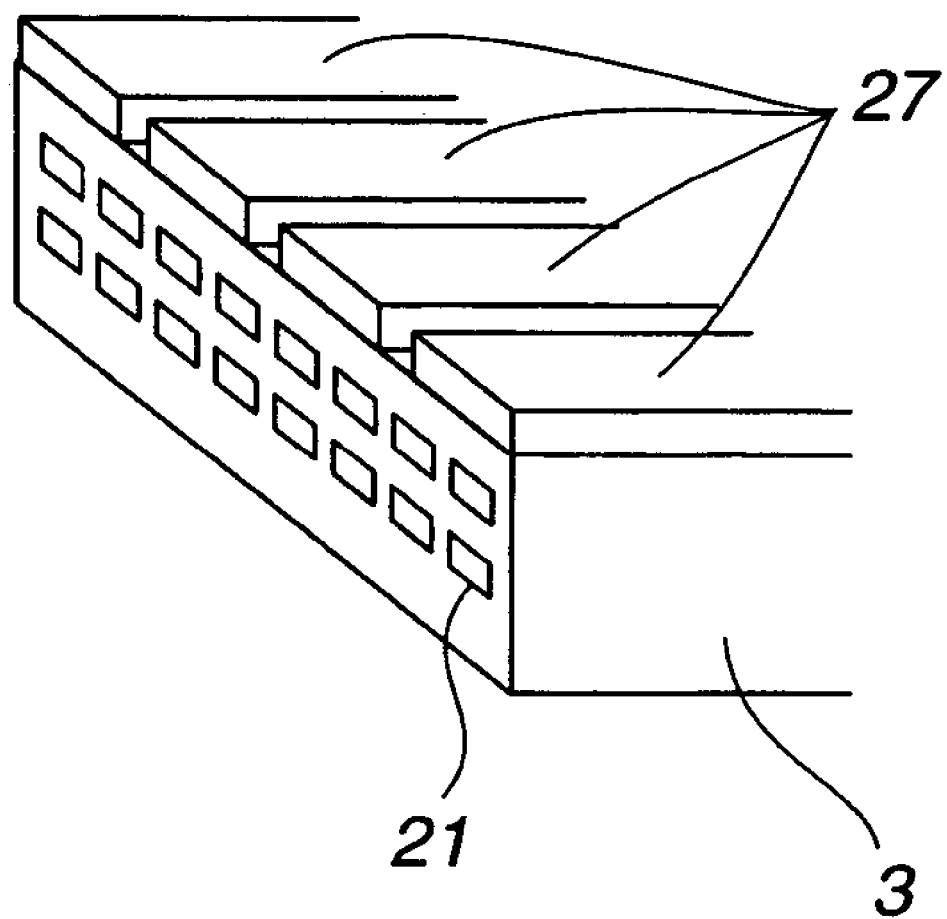
FIG. 7 is a perspective view illustrating a sheet with integrated optical wiring and electric wiring.

The core 43 has a cross section of 100 μm×80 μm, and the upper and lower cores 43 are arranged at intervals of 250 μm, respectively. The metal layer 20 acting as a supporting substrate is formed of copper (Cu) with a thickness of 100 μm. The metal layer 20 may be formed by plating, or by a method of bonding a copper thin film. The material of the metal layer 20 is not limited to copper. When the metal layer 20 is thus formed, the layer 20 functions as a heat radiator of the optical device as well as a supporter for the waveguide 3. Furthermore, when used in an equipment, the metal layer 20 can also be used to connect electric common lines between boards. When the metal layer is formed as a wiring pattern 27 as illustrated in FIG. 7, the metal layer 27 can also conduct an electric connection. The wiring pattern can be utilized as a connecting line of relatively-slow signals or analog signals, or as a power-supply line. In this case, the number of the pins 9 in the connecting portion 7 is increased, and some of the pins 9 are connected to such electric wiring.

The waveguide can be formed of various materials, and silica glass (phospho-silicate glass (PSG)) is preferable as a low refractive-index material. Where the PSG doped with P is used, the multi-layer optical wiring layer can be readily fabricated since the surface of the layer is flattened due to mass transport when heated. In this case, when the refractive index of the core layer 21 is controlled by using GPSG which is further doped with Ge, the waveguide can be readily fabricated.

The surface emitting laser for performing the E/O conversion will be described. The surface emitting laser ordinarily has a construction in which a structure sandwiching a cavity with an active layer between distributed Bragg reflector (DBR) mirrors is epitaxially grown on an n-type substrate and a current constricting structure is provided to attain a current flow only into its light radiating portion. Such lasers can be readily arranged in a two-dimensional array as illustrated in FIG. 3B. In this embodiment, an AlAs/AlGaAs multi-layer epitaxial mirror is grown on a GaAs substrate, and a surface emitting laser of a 830-nm band with a GaAs/AlGaAs multiple quantum well active layer is fabricated.

In the above structure, the common electrode is a cathode, and the electrode 13 for independent driving is an anode. FIG. 10B illustrates an E/O converting portion for driving a surface emitting laser 82. A portion at the last-stage of an LSI connected to the pin 9 of the connecting portion 7 normally includes a CMOS buffer inverter 81 to carry out a current driving through the pin 9. In this embodiment, the last-stage construction is unchanged, and the E/O conversion is achieved by the surface emitting laser 82 to couple the converted light to the waveguide 3, in place of connection by a metal cable. The driving-current capability of the CMOS buffer is normally less than 10 mA, and this capability sufficiently achieves the driving since the threshold current and operating current of the above laser 82 at the time of output of 100 μW are very low, say about 1 mA and 3 mA, respectively. When a current injected into the surface emitting laser 82 is 3 mA, its operating voltage is approximately 2.5 V. Accordingly, in the case of the CMOS 81 of 3.3 V, a serial resistor R to be inserted only needs to have a resistance of 267 Ω (=(3.3−2.5)/3×10$^{−3}$). The resistor R can be inserted into the wiring (not shown) on the plate 4 in FIG. 3A. In this system, however, there is a limitation on high-speed operation because the switching time of a p-channel of the CMOS 81 is dominant due to its cathode-common operation.

Figure 10A:
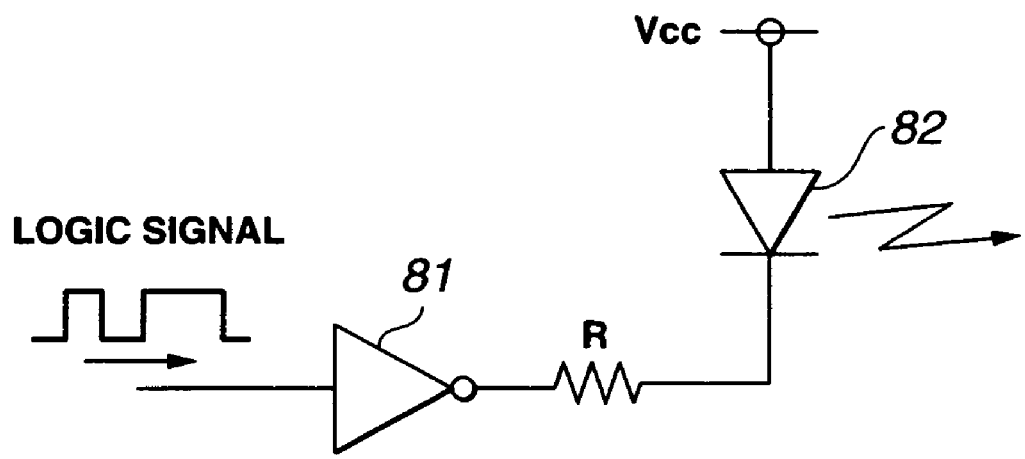
FIGS. 10A and 10B are schematic diagrams illustrating methods of driving a light emitting device in an optical wiring device of the present invention.
Figure 10B:
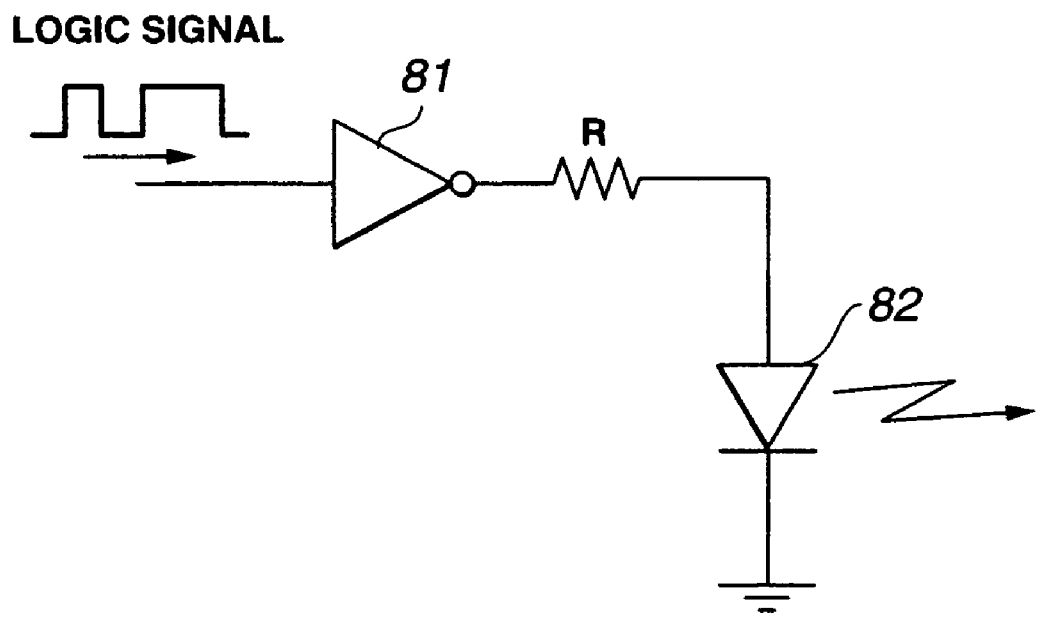

In contrast, in the case of an anode-common type as illustrated in FIG. 10A, a high-speed operation can be further promoted because the switching time of an n-channel of the CMOS 81 is dominant. Therefore, in this embodiment, it is possible to remove the n-substrate of the surface emitting laser and separate the n-side electrodes from each other to achieve the anode-common system. FIGS. 8A to 8D illustrate its fabrication method.

Figure 8A:
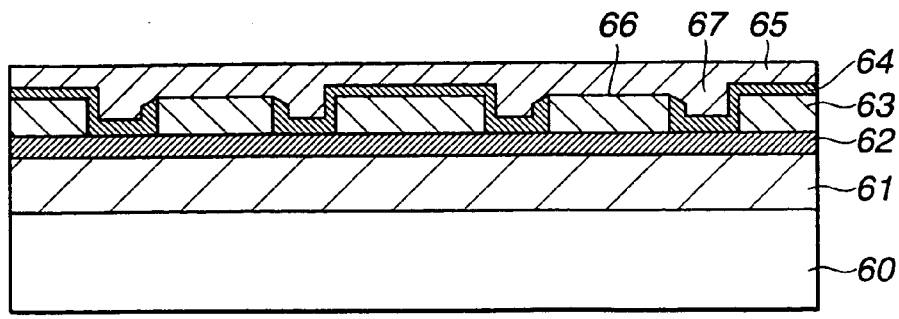
FIGS. 8A to 8D are cross-sectional views illustrating a method of fabricating a surface emitting laser with only its functional layer left.

For simplicity, only two arrayed surface emitting lasers are illustrated in FIGS. 8A to 8D. As illustrated in FIG. 8A, after an n-AlAs layer (not shown) of an etch stop layer and an n-GaAs layer (not shown) of a contact layer are grown on an n-GaAs layer 60, then an n-AlAs/AlGaAs multi-layer mirror 61, a one-wavelength cavity 62 consisting of an undoped GaAs/AlGaAs multiple quantum well active layer and an AlGaAs layer, and a p-AlAs/AlGaAs multi-layer mirror 63 are epitaxially grown using a metal organic-chemical vapor deposition (MO-CVD) or the like. An annual recess 67 is then formed by etching to form a current constricting layer 66. An insulating layer 64 of $SiN_x$ is laid down over the wafer, except over the light radiating region, and a common p-side electrode 65 is formed.

Figure 8B:
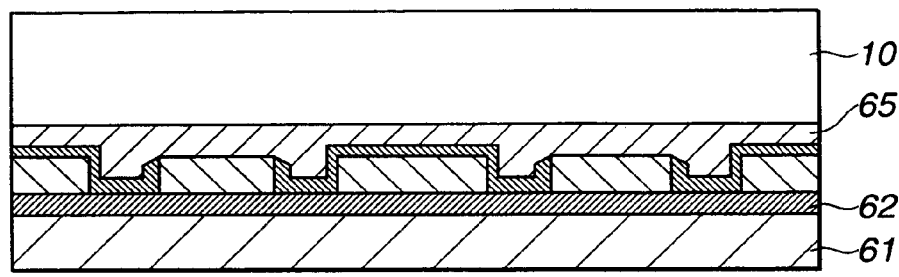

As illustrated in FIG. 8B, after the p-side electrode 65 is entirely bonded to an overall electrode (not shown) of the plate 10 with an AuSn solder, the GaAs substrate 60 is removed by polishing and chemical etching. Here, a mixture solution of $H_2O_2$ and $NH_3$ is used as an etchant, and hence, the etching can be stopped at the AlAs layer grown on the GaAs substrate 60. Immediately thereafter, the AlAs layer is removed by HCl to expose the GaAs layer grown as a lowermost layer of the mirror 61.

Figure 8C:
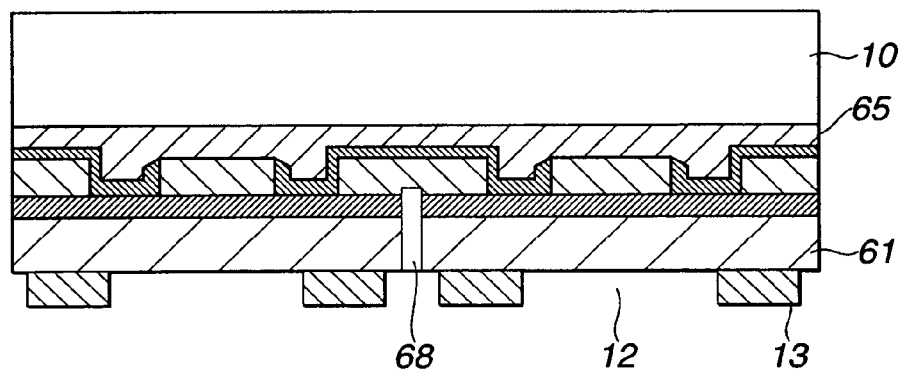

As illustrated in FIG. 8C, inter-device portions of the exposed mirror layer 61 are then wet-etched by an etchant of sulfuric-acid series to form a separating groove 68, and the n-side electrode 13 with the window 12 is formed for each optical device.

Figure 8D:
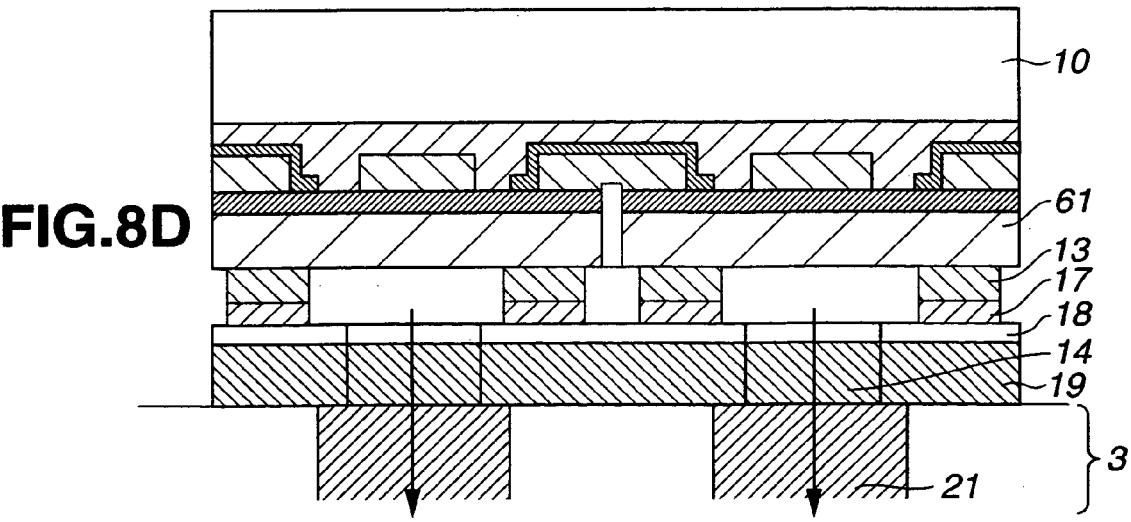

As illustrated in FIG. 8D, the TAB tape 18 with the electrodes 17 around the holes 14 is then bonded to the plate 19, and the electrode 17 and the electrode 13 of the surface emitting laser are bonded to each other with an AuSn solder. There can be thus provided an array of anode-common surface emitting lasers whose light can be taken through the window 14. The plate 19 is bonded to an end surface of the multi-core waveguide 3 in such a manner that the laser is aligned with and coupled to the core 21 of the waveguide 3.

Figure 9A:
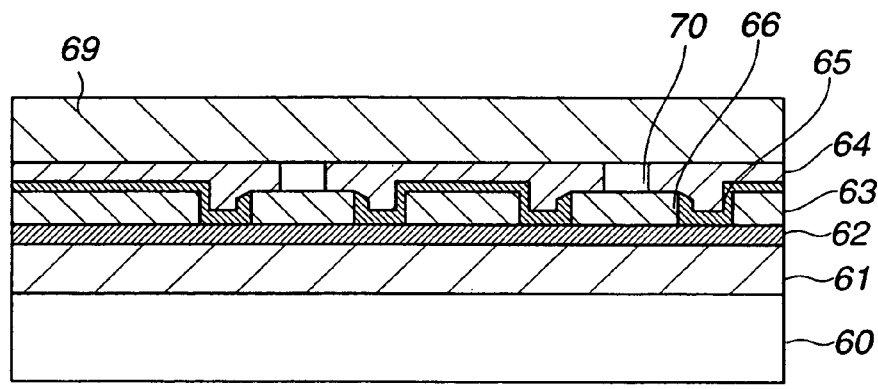
FIGS. 9A to 9C are cross-sectional views illustrating another fabrication method of a surface emitting laser with only its functional layer left.
Figure 9B:
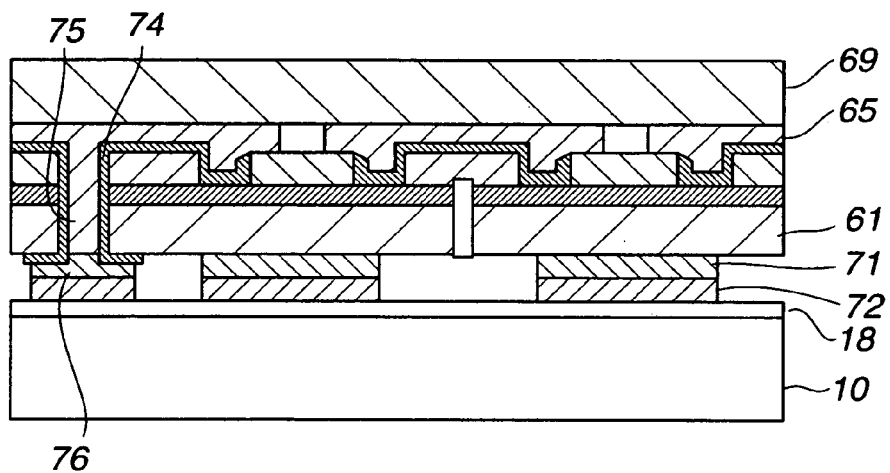
Figure 9C:
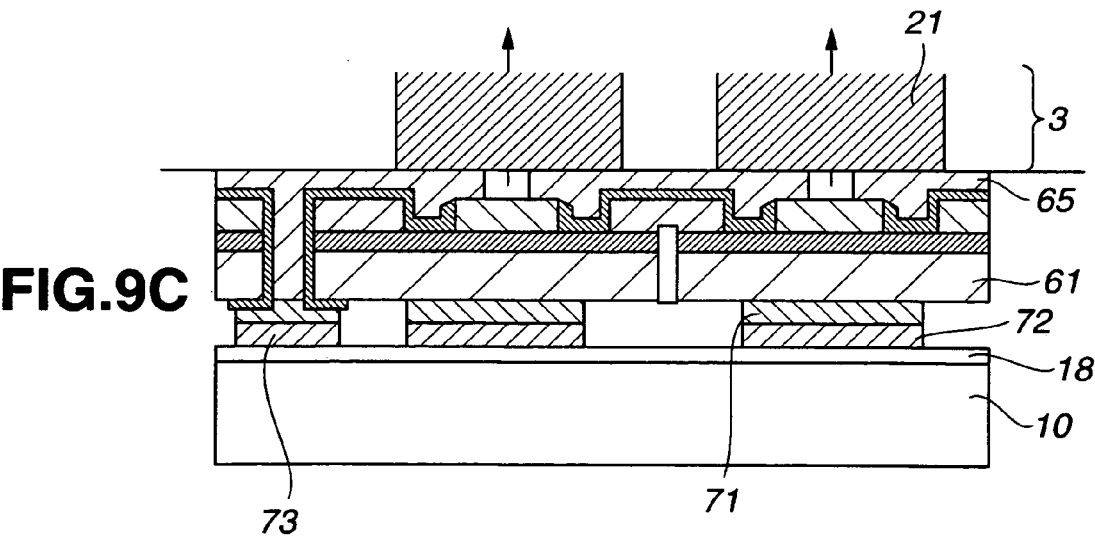

A slightly different construction can also be fabricated by a fabrication method as illustrated in FIGS. 9A to 9C. In this structure, the TAB tape 18 for wiring is attached to the plate 10 on an opposite side to the waveguide 3, a little different from the structure of FIG. 8D.

In FIG. 9A, the surface emitting laser is fabricated similarly to the case of FIG. 8A, but a window 70 for passing light is opened in the p-side electrode 65 to take out light through the p-side mirror layer 63. Further, the p-side is bonded to a quartz glass plate 69 with electron wax or the like.

As illustrated in FIG. 9B, the GaAs substrate 60 is then removed and an electrode 71 is formed for each device, similarly to the case of FIG. 8C. Here, a through-hole electrode 74 and an insulating layer 75 are formed on a region without the light radiating portion and a pad 76 of the anode electrode is formed on the same side as the cathode electrode, such that the p-side electrode 65 of a common electrode can be taken out from the same side as the n-side electrode. The plate 10 is then bonded to the TAB tape 18, and electrodes 72 and 73 on the TAB tape 18 are connected to the cathode electrode 71 and the common anode electrode 76 of the laser, respectively. There is no need to open a window in the electrodes 71 and 72 since light is not taken out from this side. The p-side is bonded to the above quartz glass plate 69 to facilitate those works.

As illustrated in FIG. 9C, the glass plate 69 is then removed, and the electrode 65 on this side is aligned with and optically coupled to the core 21 of the waveguide 3. Thereafter, the electrode 65 is bonded to the end surface of the waveguide 3. In this structure, optical loss is very little since the light emitting portion is quite close to the core 21.

In such a structure without the GaAs substrate 60, the functional layer for oscillating laser light is thin, the E/O converting portion is very compact, and the inclusion ratio of As in the construction can be largely reduced, leading to enhancement of the environmental safety. Further, the functional portion is sandwiched between the two plates 10 and 19 as illustrated in FIG. 8A to 8D. Accordingly, when those plates 10 and 19 are formed of material having a large thermal conductivity, characteristics of the laser can be further enhanced.

A light emitting diode (LED) can also be used as the surface light emitting device, but in this case the operating current goes up by one order to about 30 mA, compared with the surface emitting laser. The required electric power is thus increased, and hence, its driver portion needs to be modified.

In the above description, the surface light receiving device is not described in detail, but its construction and fabrication method are similar to those of the surface light emitting device. A p-i-n structure of GaAs is fabricated by using epitaxial growth and diffusion process, for example. Si or InGaAs may also be used. In the case of the MSM type, comb-shaped electrodes of Al or the like are formed on GaAs. In a driving circuit for the light receiving device, an amplifier and a discriminating circuit are needed. Those electronic circuits may be formed on the plate 4 with the wiring formed thereon at the rear stage of the connecting portion 7.

In the foregoing, the example of 830-nm band is described, but an InGaAs structure of 0.98-μm band, an InGaAsP structure of 1.3-μm band or the like can also be employed.

Second Embodiment

The first embodiment is directed to an optical wiring device which is principally used for parallel wiring. In this case, as the number of pins increases, the area occupied by the connecting portion and the volume of the multi-core waveguide also increase.

In the light of such a disadvantage, a second embodiment is directed to an optical wiring device in which parallel-to-serial conversion is partially conducted to decrease the number of pins and the features of the surface optical device (i.e., high-speed transmission) are utilized. In the second embodiment, a connecting pin 91 is fixed to a base plate 90 as illustrated in FIG. 11A. The protruding pin 91 is connected to a board 100 through a recessed receptacle 98 mounted to the board 100 as illustrated in FIG. 11B, or directly bonded to the board 100 with a solder 103. At the rear of the base plate 90, there is provided a bare chip 92 of a Si-IC in which a parallel-to-serial conversion IC and a laser-driving IC are integrated. A surface optical device 93 is stacked on the Si-IC 92 in a flip-chip implementation manner as indicated by a phantom line in FIG. 11A. The optical device 93 is bonded to a waveguide 95 in such a manner that each optical device 93 is aligned with and optically coupled to each core 94 of the waveguide 95. An end socket 96 is bonded to the waveguide 95 to achieve functions of protection and easy handling.

Figure 12:
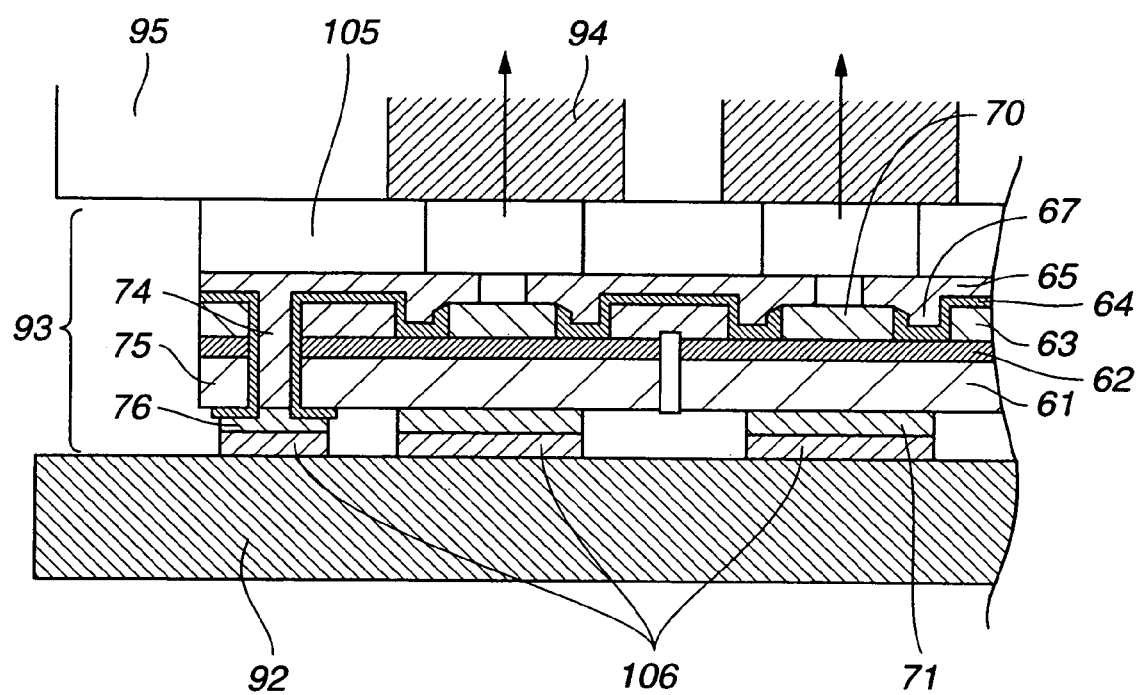
FIG. 12 is a cross-sectional view illustrating an optical wiring device in which a surface emitting laser and an LSI are provided on a common substrate.

Structures of the Si-IC 92 and the optical device 93 will be described. FIG. 12 illustrates a cross section of the optical device (surface emitting laser) 93. The Si-IC 92 illustrated in FIG. 12 is implemented on the base plate 90 (not shown in FIG. 12), and electrically connected to the pins 91. The Si-IC 92 has a region in which the optical device 93 is implemented, and the optical device 93 is connected to the electrode of the Si-IC 92 through a wiring 106. The wiring 106 and the surface optical device 93 are implemented in a flip-chip manner with the electrodes 71 and 76 being aligned with the wiring 106 as illustrated in FIG. 12.

The cross section of the surface optical device 93 in FIG. 12 is the same as that of the surface emitting laser in the first embodiment of FIGS. 9A to 9C. In FIG. 12, the same functional portions as those in FIGS. 9A to 9C are designated by the same reference numerals, with the exception that the TAB tape 18 is omitted and a ceramic plate 105 is provided to enhance a thermal conductivity of the surface bonded to the waveguide 95 and reinforce the optical device 93 in FIG. 12. Here, the element 92 is described as the Si-IC, but this is a simple wiring substrate when no serial-to-parallel conversion is required.

Further, the surface emitting laser is described in the foregoing, but the surface light receiving device can be similarly implemented. Where four (4=2×2) cores 94 are arranged as illustrated in FIG. 11A, two surface emitting lasers and two surface light receiving devices are arranged, for example.

The method of connection to the board 100 will be described in detail referring to FIGS. 11B and 11C. FIG. 11B illustrates the case where the socket 98 is provided on the board 100, and the pin 91 is connected to a leaf spring 99. A pin 101 extending from the socket 98 is bonded to the board 100 with a solder 102. FIG. 11C illustrates the case where no socket is provided on the board 100, and the pin 91 is bonded directly to the board 100 with the solder 103. In this case, the pin 91 can be changed to a flat type which extends in parallel with the base plate 90 such that the pin 91 can be surface-implemented.

In FIGS. 11B and 11C, a member 97 for reinforcement and covering is provided, and the member 97 is implemented after the base plate 90, the Si-IC 92, the optical device 93 and the waveguide 95 are stacked. The member 97 is not illustrated in FIG. 11A. The multi-core waveguide 95 with the cores 94 may be similar to that of the first embodiment, but a waveguide with one-dimensionally arrayed cores may be used where the number of cores is small. A fiber array with one-dimensionally arranged optical fibers is also usable.

Figure 13:
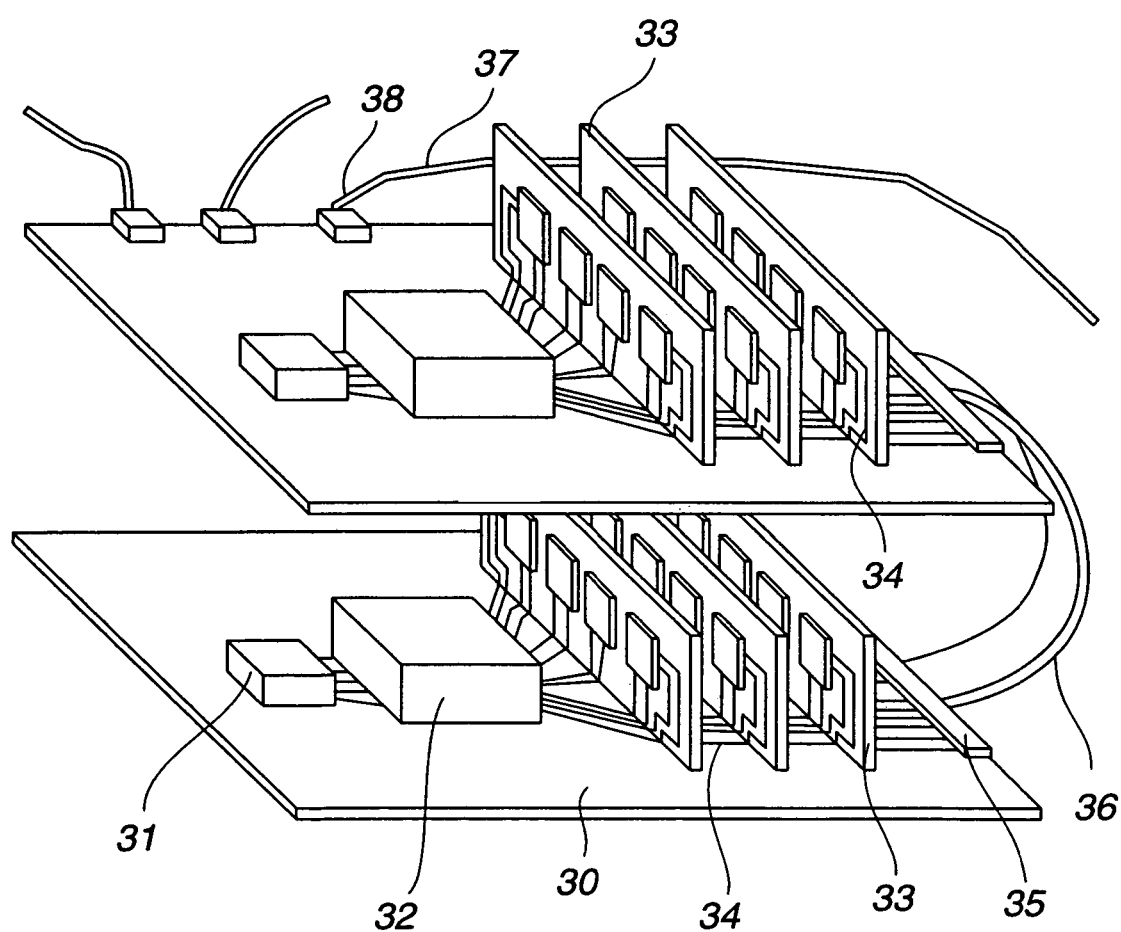
FIG. 13 is a perspective view illustrating an example of inter-board connection using an optical wiring device of the present invention.

The entire structure constructed by using the thus-fabricated optical wiring device of the first or second embodiment is illustrated in FIG. 13. In FIG. 13, reference numeral 30 indicates a mother board constructed as an optoelectric mixture substrate. Reference numeral 32 indicates a large scale central arithmetic processing unit (a microprocessor unit (MPU)). Reference numeral 31 indicates a primary cache memory. Reference numeral 33 indicates a structure in which an MCM with DRAMs mounted thereon is mounted to the mother board 30 as a daughter board. The signal transmission in the boards 30 and 33 is performed through a wiring 34, but in the case of fast signals a part thereof can be transmitted through the waveguide. Parallel connection between the boards is conducted through a connecting portion 35 with a built-in optoelectric converter and a multi-core waveguide 36 of the first embodiment. The volume of the waveguide 36 is smaller than that of a conventional electric wiring, and the former is also more flexible than the latter. Therefore, even when the density of the wiring is high, loading and unloading of the waveguide 36 is easy. Further, no interference of electromagnetic waves exists at the wiring portion, so the problems of cross-talk and radiation noise are solved. At the same time, the apparatus can be readily designed since there is no need for impedance matching at the connecting portion 35.

With the signal exchange with an exterior memory unit such as a hard disc drive, it is preferable to conduct a serial rapid transfer by using a connector 38 and a multi-core waveguide 37 of the second embodiment at a relatively low cost. Therefore, a transmitting/receiving unit is provided in the connector 38 to perform a parallel-serial conversion and achieve a transfer rate of about 10 Gbps. Although only main portions of the boards are illustrated in FIG. 13, a next-generation computer with a clock rate of over 1 GHz can be constructed by forming a necessary circuit structure and connecting the boards or electronic equipment built in the apparatus through the optical wiring of the present invention.

In the above structure, as compared with the case using the LVDS system, faster and smaller structures are possible, the required electric power can be reduced, and the problem of EMI can be readily solved. Also with its improved reliability, and ease of loading and unloading of the cable, and lower cost, the optical wiring of the present invention is more advantageous than an optical interconnection using a conventional optical connector. Further, since even faster and smaller constructions are required and a further decrease in EMI is indispensable in recent electronic equipment, such as computers, portable phones and digital cameras, the optical wiring of the present invention is quite effective for those equipment.

Third Embodiment

In the first and second embodiments, the multi-core waveguide fabricated by the surface process is used as the optical cable. However, when the length of the wiring between apparatuses, for example, is over 1 m, the structure using an optical fiber is more advantageous in a total cost. Therefore, in a third embodiment, an optical wiring connector is constructed by using a fiber array.

Figure 14:
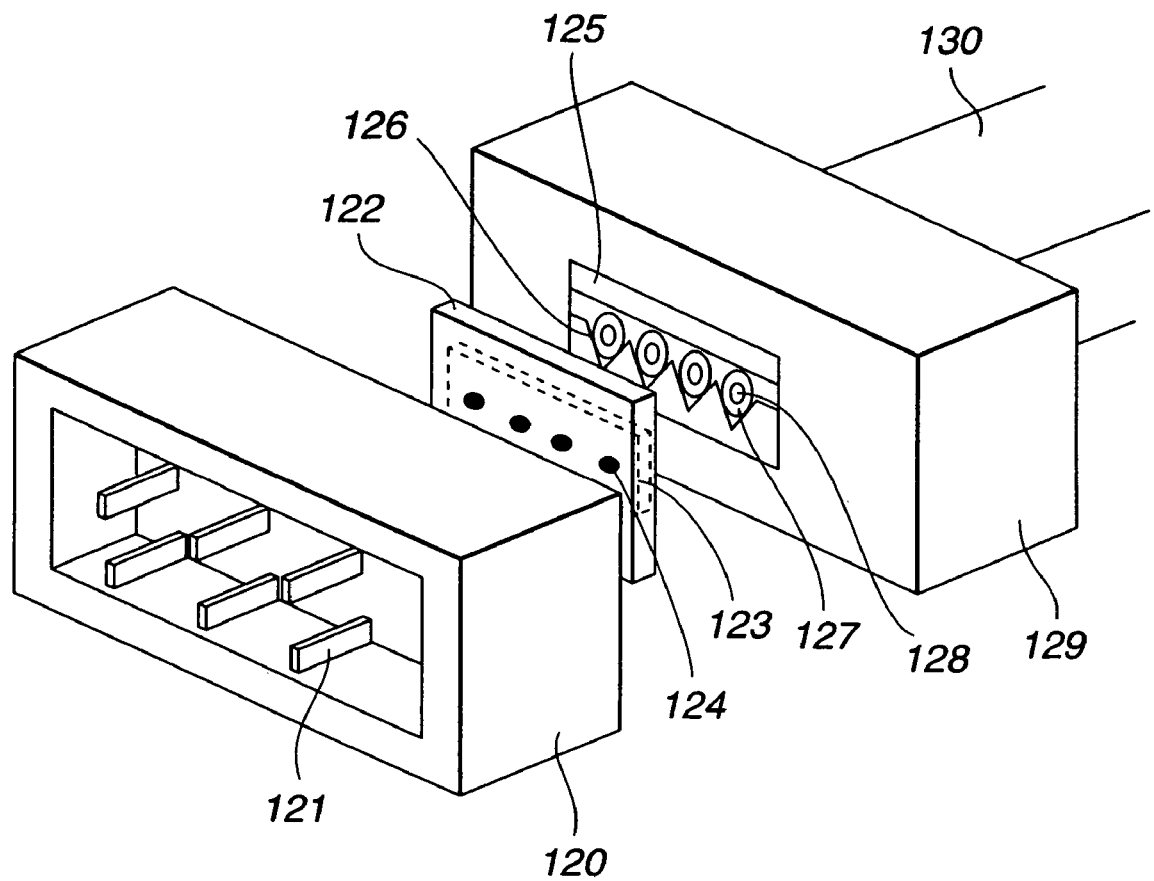
FIG. 14 is a perspective view illustrating the disassembled structure of an optical wiring connector of a third embodiment according to the present invention.

FIG. 14 illustrates the structure of the third embodiment. As illustrated in FIG. 14, pins 121 for electric connection are arranged on an electric connecting portion 120, and a Si-IC 122 is implemented on the connecting portion 120 in a flip-chip manner such that the Si-IC 122 is connected to the pins 121.

In the Si-IC 122, similarly to the second embodiment, driving ICs for the surface emitting laser and the surface light receiving device are integrated. The Si-IC 122 has a region for the implementation of optical devices 123 and electrode pads, similarly to the second embodiment. The optical device 123 is stacked on the Si-IC 122. The optical devices 123 include the surface emitting laser and the surface p-i-n PD. Those optical devices 123 may be formed on a common substrate, or they may be separately fabricated and implemented on a common Si-IC in a hybrid form and in a flip-chip manner. The Si-IC 122 and the optical device 123 can be stacked similarly to the second embodiment.

As a waveguide 130 an array of four fibers with a clad 127 and a core 128 arranged at a pitch of 250 μm is used. Here, a GI(graded index)-50 is used as the fiber, but a single mode fiber or a plastic optical fiber (POF) may also be used. Among the POFs, an HPCF fiber with a quartz core 128 and a plastic clad 127 is preferable. The diameter of the quartz core 128 is about 200 μm, and hence, its optical coupling is easy and optical loss is low. Further, its cost can be reduced.

The fiber array can be readily fabricated with good precision, as follows. As illustrated FIG. 14, fibers are arranged on V-shaped grooves of a Si substrate 126, and the fibers are covered by a flat Si substrate 125 and fixed with an adhesive. A member 129 for reinforcement and handling is bonded to an end portion of the waveguide (fiber array) 130, and its end surface is polished. A light receiving/emitting portion 124 of the optical device 123 stacked on the above Si-IC 122 is aligned with and optically coupled to the optical fiber, and the end surface of the reinforcing member 129 is then bonded to the optical device 123. Finally, a cover member (not shown) for reinforcement is further bonded between the connecting portion 120 and the member 129, or the entire structure is molded with a molding material. The optical wiring device or connector with a optoelectric conversion function is thus completed.

In the device, the optical fiber is used, so the distance of transmission can be freely selected in a range up to over 100 m. Further, there is no problem of electromagnetic noise because of the optical transmission, and there is no need of impedance matching at the connecting portion. Moreover, since the connecting portion has no optical coupling portion, reliability is high and no danger exists at the time of loading and unloading.

Such an optical wiring device can be employed for fast transmission between electronic equipment using a next-generation IEEE1394, a Gbit-class Ethernet between computers, and the like. An example is illustrated in FIG. 15.

Figure 15:
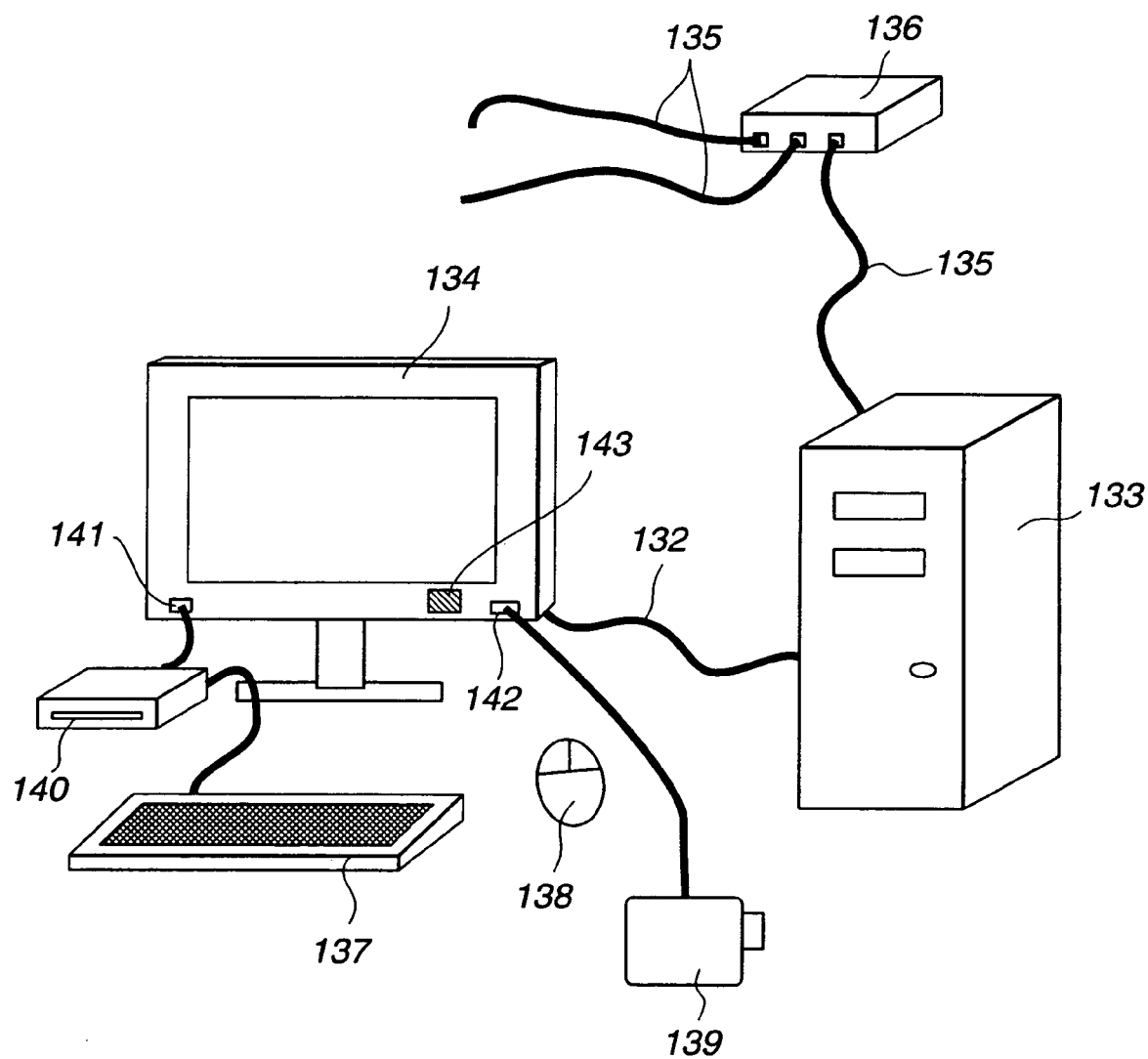
FIG. 15 is a perspective view illustrating an example of computer equipment using an optical wiring device of the present invention.

In FIG. 15, a body 133 of a personal computer (PC) is connected to a liquid-crystal (LC) display 134 through an optical wiring device 132 of the present invention. On a front surface of the LC display 134, there are provided a port 141, such as a universal serial bus (USB), to which a keyboard 137 or an external memory 140 can be connected, and an IEEE1394 port 142 to which a digital video apparatus 139 is connected. A mouse 138 is spatially connected to a sensor 143 provided on the front of the LC display 134, through infrared rays. Such a construction is an example of connection in a PC in course of development for next generation. When connecting ports are formed on the display front user interface, fast transmission is required between the PC body 133 and the display 134. Here, when the optical wiring device 132 with the electric connecting portion of the present invention is used as the wiring, a connection capable of fast transfer can be attained at low cost and with low EMI. In this construction, no optical coupler is used in the connecting portion, and hence, general consumers can readily handle the optical wiring device.

Also, with connections to a hub 136 and a local area network (LAN), GIII-class connections are being required. When an optical wiring cable 135 of the present invention is used, reductions of cost, weight and space of the cable can be reliably achieved. In the above embodiments, the connecting portion only includes pins for electric connections, but a part, of the connecting portion may include an optical connector for optical coupling.

While the present invention has been described with respect to what is presently considered to be the preferred embodiments, it is to be understood that the invention is not limited to the disclosed embodiments.

The present invention is intended to cover various modifications and equivalent arrangements included within the spirit and scope of the appended claims.

What is claimed is:

1. An optical wiring device comprising:
   a base plate;
   an electrical connecting portion, said electrical connecting portion being fixed to said base plate;
   an optical transmission means for transmitting an optical signal;
   a surface optical device for conducting an optoelectric conversion, said surface optical device being provided between said base plate and said optical transmission means; and
   a reinforcement member for reinforcement around an end of said optical transmission means, wherein said reinforcement member is separate from said optical transmission means;
   wherein said surface optical device is covered by the reinforcement member, with a space between said surface optical device and the reinforcement member, and
   wherein said electrical connecting portion is detachably connectable to an electrical terminal.

2. An optical wiring device according to claim 1, wherein said surface optical device is a surface emitting laser.

* * * * *

UNITED STATES PATENT AND TRADEMARK OFFICE
CERTIFICATE OF CORRECTION

PATENT NO. : 7,062,116 B2  Page 1 of 1
APPLICATION NO. : 10/958370
DATED : June 13, 2006
INVENTOR(S) : Toshihiko Ouchi It is certified that error appears in the above-identified patent and that said Letters Patent is hereby corrected as shown below:

On The Title Page, Item (56):
References Cited, FOREIGN PATENT DOCUMENTS,
"07/30209" should read -- 07-30209 --;
"08/78783" should read -- 08-78783 --; and
"09/80360" should read -- 09-80360 --.

COLUMN 1:
Line 4, "Jul. 27, 2002" should read -- Jul. 27, 2000 --.

COLUMN 2:
Line 61, "a optical" should read -- an optical --.

Signed and Sealed this

Third Day of July, 2007

JON W. DUDAS
*Director of the United States Patent and Trademark Office*